United States Patent
Breay

(10) Patent No.: US 7,222,889 B2
(45) Date of Patent: May 29, 2007

(54) SELF-LOCKING SELF-BONDING RIGID COUPLING

(75) Inventor: Clifton P. Breay, Indian Hills, CO (US)

(73) Assignee: Stanley Aviation Corporation, Aurora, CO (US)

( * ) Notice: Subject to any disclaimer, the term of this patent is extended or adjusted under 35 U.S.C. 154(b) by 92 days.

(21) Appl. No.: 11/210,641

(22) Filed: Aug. 23, 2005

(65) Prior Publication Data

US 2007/0052234 A1   Mar. 8, 2007

(51) Int. Cl.
*F16L 19/00* (2006.01)
*F16L 17/00* (2006.01)

(52) U.S. Cl. .................. 285/354; 285/386; 285/349; 285/89

(58) Field of Classification Search ............ 285/81, 285/89, 92, 349, 354, 386
See application file for complete search history.

(56) References Cited

U.S. PATENT DOCUMENTS

| | | |
|---|---|---|
| 3,669,472 A | 6/1972 | Nadsady |
| 3,999,825 A | 12/1976 | Cannon |
| 4,008,937 A | 2/1977 | Filippi |
| 4,249,786 A | 2/1981 | Mahoff |
| 4,285,564 A | 8/1981 | Spinner |
| 4,346,428 A | 8/1982 | Gale |
| 4,808,117 A | 2/1989 | Gale et al. |
| 4,881,760 A | 11/1989 | Runkles et al. |
| 4,900,070 A | 2/1990 | Runkles et al. |
| 4,928,202 A | 5/1990 | Gale et al. |
| 5,871,239 A | 2/1999 | Boscaljon et al. |
| 6,050,609 A | 4/2000 | Boscaljon et al. |
| 6,073,973 A | 6/2000 | Boscaljon et al. |
| 6,883,836 B2 | 4/2005 | Breay et al. |

FOREIGN PATENT DOCUMENTS

| | | |
|---|---|---|
| EP | 0 412 677 A2 | 2/1991 |
| WO | WO 98/19095 | 5/1998 |

OTHER PUBLICATIONS

SAE AS1730 Aerospace Standard Coupling, Fuel, Rigid Threaded Type; Issued Sep. 1982, Reaffirmed Apr. 1996.

*Primary Examiner*—Aaron Dunwoody
*Assistant Examiner*—Fannie C. Kee
(74) *Attorney, Agent, or Firm*—Sheridan Ross PC

(57) ABSTRACT

A coupling assembly is provided for releasably interconnecting confronting ends of conduit members. The coupling assembly creates a self-locking, and self-bonding connection wherein locking and unlocking is achieved by a predetermined amount of rotation of a lock nut group with respect to a stationary threaded flange. The overall construction of the coupling assembly creates the rigid connection between the conduit members, yet adequate sealing between the conduit members is provided by a single sealing member.

15 Claims, 6 Drawing Sheets

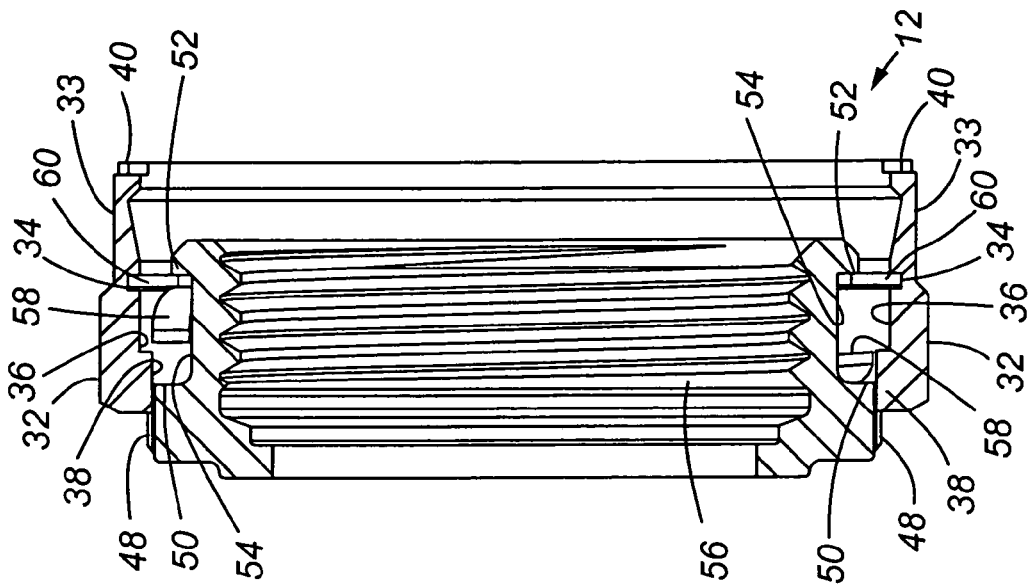
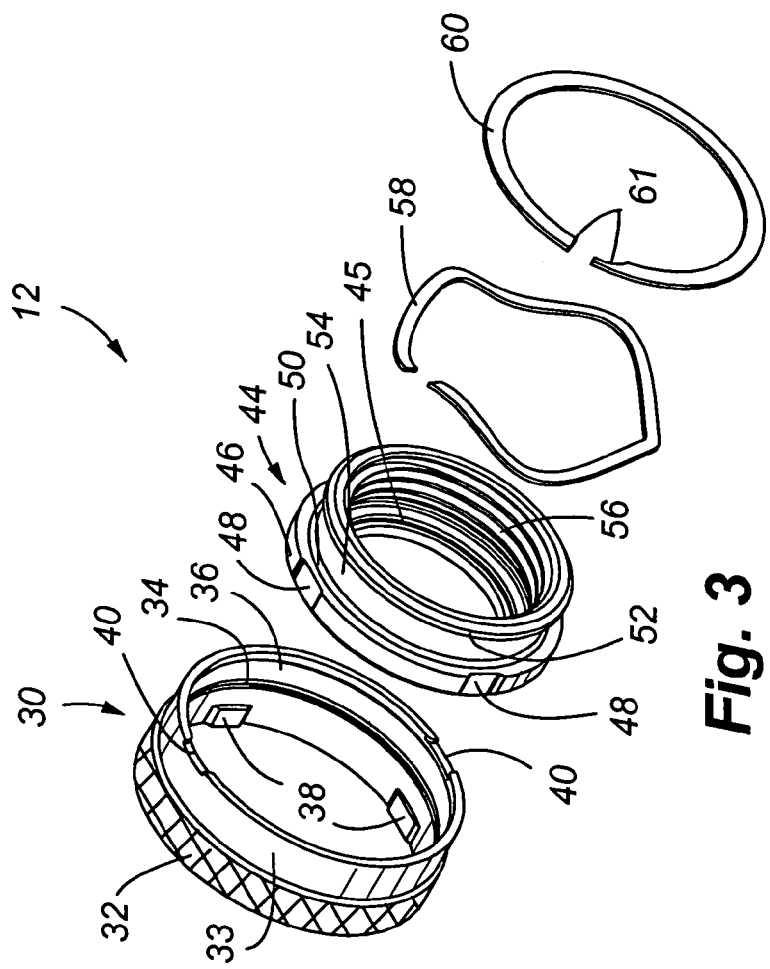

SELF-LOCKING SELF-BONDING RIGID COUPLING

FIELD OF THE INVENTION

This invention relates to a coupling assembly for interconnecting two members, and more particularly, to a self-locking, self-bonding, rigid coupling assembly for interconnecting a pair of tubular conduit members wherein the coupling assembly has a releasable locking feature for connection and disconnection.

BACKGROUND OF THE INVENTION

The owner of the current invention is also the owner of a number of previous patents for couplings used to interconnect confronting ends of fluid carrying conduits in an aircraft. These patents include the U.S. Pat. Nos. 5,871,239; 6,050,609; and 6,073,973. Characteristics common to each of the inventions disclosed in these patents are coupling devices that include a plurality of threaded members which are rotatable in a locking direction, and rotatable in an opposite unlocking direction. Locking of the couplings is achieved by locking tabs that are received in corresponding notches/reliefs. A resilient member is provided to ensure that the couplings remain in a locked position when the coupling is tightened to a predetermined extent during rotation in a locking direction. Visual indicia is provided to indicate when the couplings have been placed into locking engagement.

Nadsady U.S. Pat. No. 3,669,472; Gale et al. U.S. Pat. No. 4,808,117 and Gale et al. U.S. Pat. No. 4,928,202 each disclose a coupling device in which the tightening of the coupling parts is readily accomplished, but accidental loosening is restrained by spring fingers carried by one of the coupling parts which engage indentations or notches on the other coupling part in such a manner as to favor relative rotation of the coupling parts in the tightening direction, while restraining with greater force the rotation of the coupling parts in the opposite unlocking direction.

Cannon U.S. Pat. No. 3,999,825; Filippi U.S. Pat. No. 4,008,937; Mahoff U.S. Pat. No. 4,249,786 and Gale U.S. Pat. No. 4,346,428 each disclose a coupling with one or more toggle latches which snap into a positive locking position.

Spinner U.S. Pat. No. 4,285,564 discloses a coaxial plug connector wherein a first ring of axially pointed teeth is provided around the circumference of a cap ring. A first connector has a ring with teeth for engaging the teeth on the cap ring. The cap ring is withdrawn axially against the force of a biasing spring when the coupling is rotated to a different position. The cap ring is released and the spring urges it into locking engagement with the tooth ring. Thus, accidental rotation of the cap ring relative to the first connector is prevented.

Runkles et al. U.S. Pat. No. 4,881,760 discloses a coupling with locking tines having visible indicia for determining whether or not the tines are in locked position.

Runkles et al. U.S. Pat. No. 4,900,070 discloses a coupling with spring biased rotatable locking tines.

Many prior art coupling devices are specifically designed so that the couplings are able to maintain a fluid tight connection between the conduits even when the joined conduits are misaligned. These couplings typically use multiple sealing members or o-rings in at least two or more coupling components to provide some amount of resiliency in the coupling allowing misalignment. For couplings used in aircraft applications, this misalignment can be caused by live loading conditions wherein vibrations from the aircraft and other forces cause periodic shifting of the conduit members. This misalignment can also be caused by static forces, such as may be attributed to the particular orientation of the conduit members when they are assembled in the aircraft.

In the construction of an aircraft, there are constraints in available spaces to run conduits for hydraulic and electrical lines. In such constrained spaces, it is very difficult to provide the necessary support brackets to support the conduits. More particularly, when it is necessary to make a connection between confronting ends of conduit members, the constrained spaces make it even more difficult to install the couplings and to provide support brackets near the couplings. Although many couplings as mentioned above have the capability to provide a sealed connection with misaligned conduits, misalignment is avoided in most all aircraft applications as a safety precaution to prevent fuel leakage for fuel lines.

Therefore, there is a need for a rigid connection that can be established between confronting conduit members thereby eliminating the need for further structural support to join the conduit members, yet the connection should be lightweight, capable of transmitting shear loads between the conduit members, and of a small enough size that the coupling can fit within the constrained spaces. Additionally, it is highly advantageous to provide electrical continuity between the interconnected conduits. Electrical continuity ensures that there will not be a buildup of an electrostatic charge on a first conduit relative to the second interconnected adjacent conduit. As a result, there is no potential difference between joined conduits or between a conduit and another reference surface, thereby eliminating the creation of an electrical spark that otherwise could ignite vaporized fuel present in the conduit members.

SUMMARY OF THE INVENTION

In accordance with the present invention, a threaded coupling assembly is provided that is self-locking, self-bonding, and provides a rigid self-supporting connection between confronting ends of conduit members.

In a preferred embodiment of the present invention, the coupling is an assembly of components including a threaded flange connected to a first conduit member, a standard flange connected to a second conduit member, and a lock nut group that interconnects the standard flange to the threaded flange. In the rigid connection, a single o-ring is utilized to seal a continuous passageway through the first and second conduit members. The lock nut group connects to the threaded flange by a threaded connection, wherein the threads of the lock nut group are clocked with respect to the threads on the threaded flange. A pre-determined amount of rotation of the lock nut group with respect to the threaded flange results in alignment of locking features on the lock nut group and the threaded flange. Once aligned, the locking features snap fit into a locking engagement.

The coupling creates a rigid connection. Looseness or flexibility of the connection between the first and second conduit members is limited by a number of factors. One factor is the manner by which the threaded flange and standard flange connect to their respective conduit members. Preferably, these connections are swage type connections so that stiffness and rigidness is maintained. Another factor is the interface between the standard flange and lock nut group by use of a close tolerance fit between the opening of the lock nut group that receives the standard flange. A flat washer or bushing is placed in the opening, and rotation of the lock nut group in the locking direction captures the bushing between an interior shoulder of the lock nut group and an external shoulder of the standard flange. Other factors include use of a single o-ring, and the threaded connection between the lock nut group and the threaded flange.

When the coupling assembly is to be placed in the locked position, the locking features in the form of complementary peripheral facing surfaces are provided on the threaded flange and on the lock nut group so that when the lock nut group is drawn axially toward the threaded flange by rotatably threading the lock nut group, the complementary facing surfaces snap into the locked position.

The complementary peripheral facing surfaces in the preferred embodiment include at least one notch or relief formed on the lock nut group, and a corresponding at least one projection or tab formed on a peripheral surface of the threaded flange The predetermined amount of rotation of the lock nut group with respect to the standard flange results in positive engagement of the tab(s) with corresponding notch (es).

Visual and audio indicators may be provided to confirm positive engagement. A visual indicator in the form of an indicator stripe may be placed on the exposed peripheral surface or rim of the threaded flange that allows the user to observe whether the lock nut group has been fully installed over the threaded flange. The indicator stripe is located on the part of the rim of the threaded flange which is covered by the lock nut group once the lock nut group is fully screwed over the threaded flange. For the audible indicator, a distinct clicking sound is present due to a biased arrangement of the components within the lock nut group, wherein a nut body and a lock ring of the lock nut group are biased with respect to axial movement along the longitudinal axis. A biasing member in the form of a wave spring maintains a spring force to maintain the lock nut group in positive engagement with the threaded flange when in the locked position. The coupling is unlocked by pulling the lock nut group so that the tab(s) are disengaged from the corresponding notch(es), and then rotating the lock nut group in an opposite unlocking direction.

The lock nut group includes a number of parts, to include a split retainer, a lock ring, the wave spring mentioned above, and a nut body. The split retainer is retained within the lock ring by an annular slot or shoulder formed on the interior surface of the lock ring. The wave spring resides within a specified gap between the lock ring and nut body. The wave spring is delimited in axial movement on one side by the split retainer, and is retained on the other side by an interior shoulder of the nut body.

A plurality of keys or projections are formed on the interior surface of the lock ring and are placed in mating engagement with a corresponding plurality of notches or keys formed on the outer surface or rim of the nut body. Thus when the lock nut group is assembled, the lock ring is axially or longitudinally displaceable with respect to the nut body to the extent that the wave spring can be compressed and decompressed within the fixed space or gap between the lock ring and nut body.

The leak proof path or passageway that is maintained between the first and second conduit members is achieved by adequate compression of the o-ring which is positioned between a facing surface of the standard flange and a facing surface of the threaded flange. Preferably, the threaded flange includes an annular slot or groove that receives the o-ring, and the facing surface of the standard flange is sized to be received within the annular groove where the o-ring resides. As the lock nut group is advanced towards the threaded flange in the locking direction rotation, the o-ring is compressed thereby creating a leakproof seal.

The coupling of the present invention also maintains outstanding electrical conductivity through the entire fitting assembly to ensure that there is minimal or no static buildup across the connection between the conduit members. The use of a single o-ring member which is bypassed by metal to metal contact of numerous components of the coupling assembly ensures that there is minimal isolation of parts in the first and second conduit members. Additionally, electrical conductivity can be further enhanced by coating various elements of the coupling assembly with conductive coatings. Conductive coatings that may be used include electroless nickel or nickel Teflon coatings. One or more of the parts or elements, as necessary, can be provided with the conductive coatings. Accordingly, the coupling assembly of the present invention requires no bonding springs within the conduit members, nor does the coupling require any electrical jumpers that are normally mounted to the coupling assembly in order to ensure electrical continuity.

Types of materials that can be used with the various components of the coupling assembly of the present invention include, but are not limited to, titanium based alloys, aluminum alloys, or even stainless steel alloys. Of course, the most lightweight and high strength alloys are of particular utility with regard to aircraft applications.

Also in accordance with another aspect of the present invention, a method is provided for interconnecting a pair of confronting ends of conduit members. The method is particularly useful with respect to conduits used to convey fuel and hydraulic fluids. The method comprises providing a pair of confronting ends of conduit members that must be joined in a rigid connection, configuring the ends of the conduit members to include a standard flange on one end and a threaded flange on the other end, providing a lock nut group for joining the standard flange to the threaded flange, and ensuring a locking arrangement between the flanges by a locking arrangement of the lock nut group with respect to the threaded flange.

Additional advantages and features of the present invention will become apparent from the detailed description which follows, taken in conjunction with the accompanying drawings.

BRIEF DESCRIPTION OF THE DRAWINGS

FIG. 3 is an exploded perspective view of the lock nut group of the present invention;

FIG. 4 is an enlarged vertical section of an assembled lock nut group in accordance with the construction of FIG. 3;

DETAILED DESCRIPTION

Figure 1:
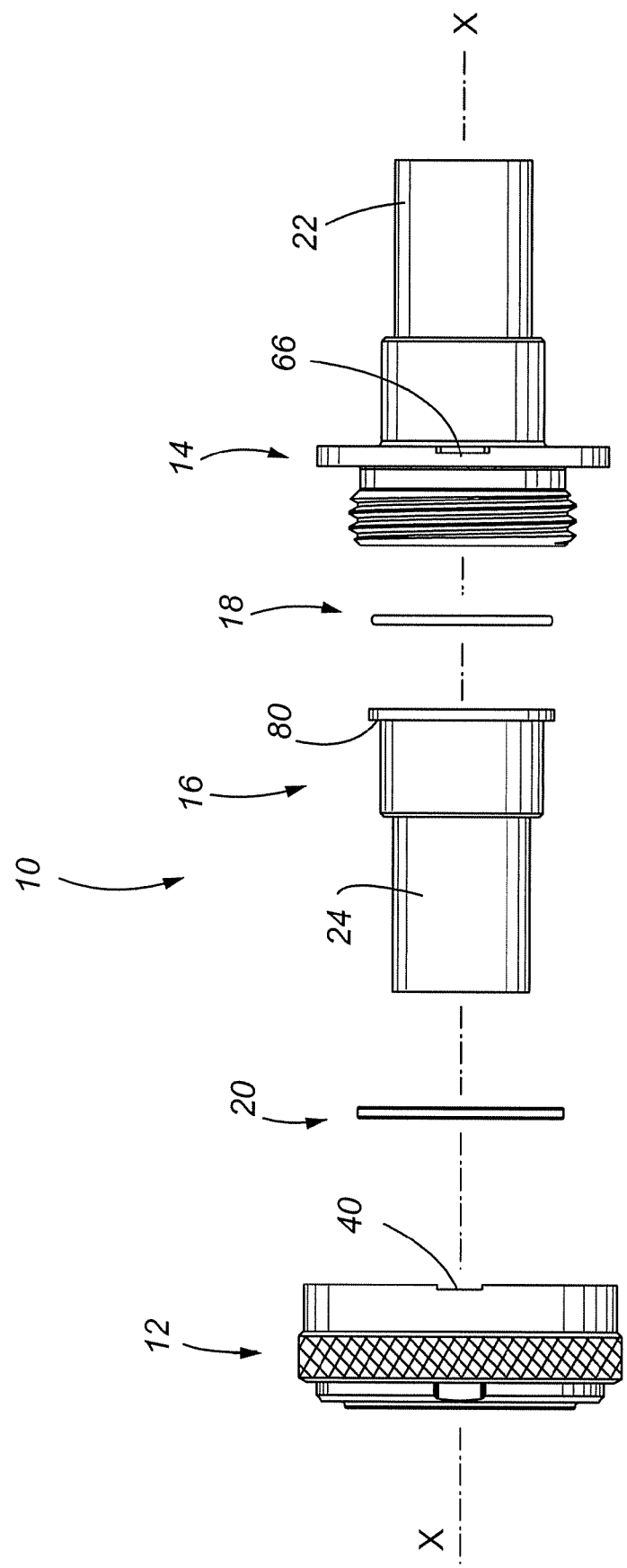
FIG. 1 is an elevation or side view illustrating the primary components of the coupling of the present invention aligned along a longitudinal axis.
Figure 2:
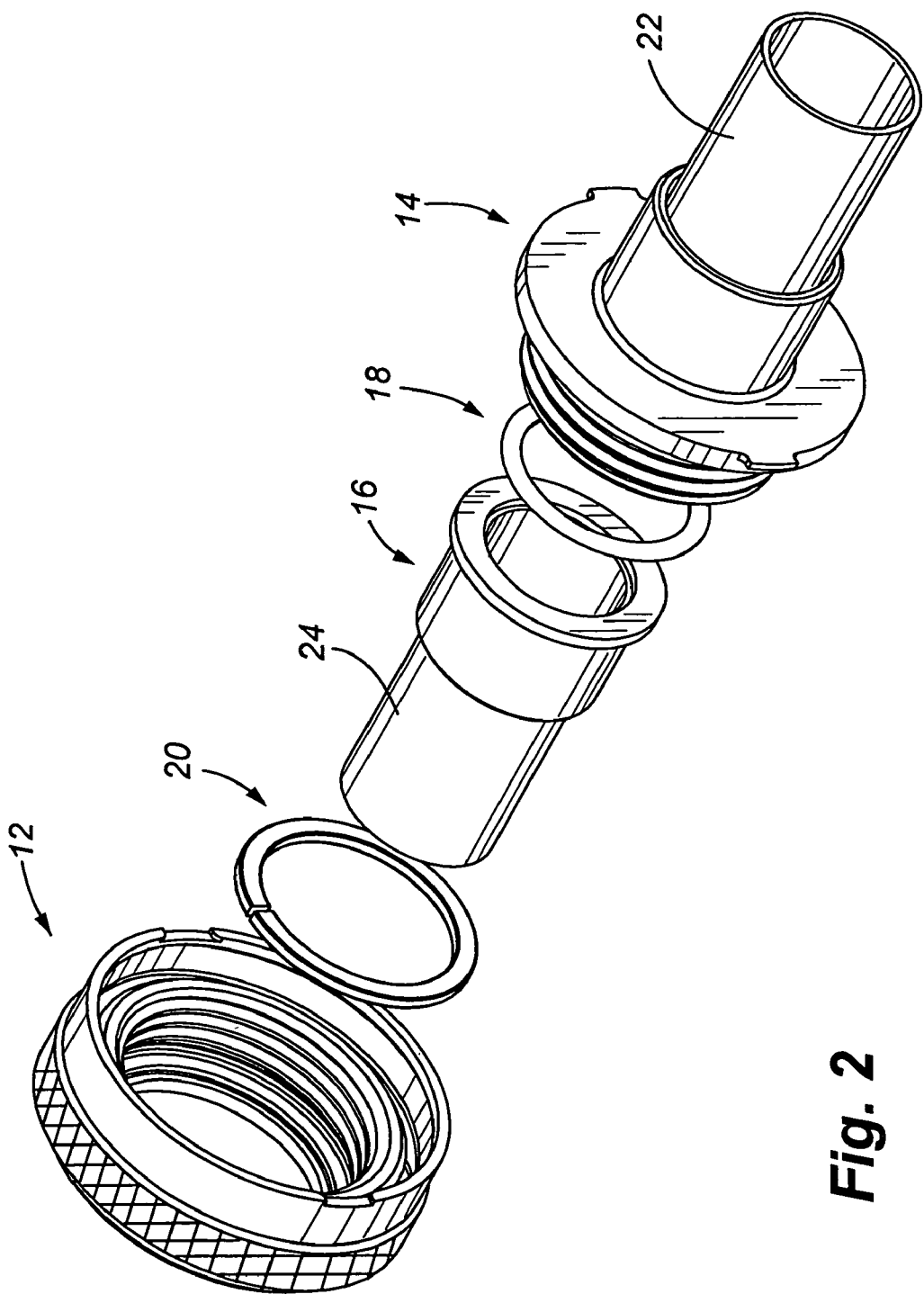
FIG. 2 is an exploded perspective view of the components shown in FIG. 1 aligned along the longitudinal axis.

FIGS. 1 and 2 illustrate the coupling assembly 10 of the present invention for rigidly connecting confronting ends of two conduit members.

Basic or primary components of the coupling assembly include a threaded flange or first coupling member 14, a lock nut group or second coupling member 12, a standard flange 16, an o-ring 18 positioned between a facing surface of the standard flange and a facing surface of the threaded flange, and a rigid connecting means or flat washer 20 that is positioned at the interface between the lock nut group and the standard flange.

Assembly of the coupling assembly includes placement of the flat washer 20 within the lock nut group and alignment with the opening of the lock nut group, and positioning the lock nut group over the standard flange so that when assembled, the flat washer 20 is trapped between an exterior rib or shoulder 80 of the standard flange and an interior shoulder 45 of the nut body 44, as further discussed below.

The o-ring 18 is received within an annular groove or recess 76 (FIG. 6) formed on facing surface 74 of the threaded flange. The facing surface 82 of the standard flange (FIG. 7) compresses the o-ring 18 as the lock nut group is drawn toward the threaded flange by rotating the lock nut group in the locking direction by engagement of interior threads 56 of the lock nut group with exterior threads 72 of the threaded flange. In the locked position, the pair of slots or reliefs 40 formed on the peripheral edge of the lock nut group 12 align with and engage the projections or tabs 66 formed on the rim or peripheral edge of the threaded flange.

Now referring to FIGS. 3 and 4, the lock nut group 12 is illustrated. The lock ring 30 is characterized by an outer rim 32 that may be roughened or knurled, a rim extension 33 that extends axially away from the outer rim 32, and one or more notches or reliefs 40 that engage corresponding projections or tabs 66 on the threaded flange when the coupling is in the locked position. Additionally, the interior surface of the lock ring includes one or more keys or projections 38 that align with corresponding key ways or slots 48 formed on the outer rim 46 of the lock nut 44. The nut body is inserted coaxially within the lock ring so that the keys and key ways are aligned. The key ways 48 allow relative axial displacement of the lock nut with respect to the nut body, but prevent relative rotational movement between the lock ring and nut body. Lock ring 30 is attached to nut body 44 as by a split retainer 60 that is received within an annular slot or groove 34 formed on the interior surface of the lock ring 30. The split retainer 60 is reduced in circumference by first closing the ends 61 towards one another, placing the split retainer 60 within the groove 34, and then releasing the ends 61 whereby the split retainer returns to its undeformed state with an enlarged circumference and thereby being held within the groove 34.

The structure of the nut body 44 is further characterized as including an interior shoulder 50, an exterior shoulder 52, and an axial extension 54 interconnecting the interior and exterior shoulders. The inner surface of the nut group includes threads 56 which are threaded over the exterior threads 72 of the threaded flange, as further discussed below.

A biasing member, shown in the preferred embodiment as a wave spring 58, is provided for biased relative axial displacement between the lock ring and nut body. Prior to inserting the nut body in the lock ring, the wave spring is positioned over the extension 54. Referring to FIG. 4, when the lock nut group is assembled, the spring 58 is maintained in the gap or space between the lock ring and the nut body. This gap or space is delimited annularly by the extension 54 and the interior surface 36 of the lock ring. This gap or space is delimited axially by the split retainer 60 and by the interior shoulder 50. Thus in the arrangement shown in FIG. 4, biased axial movement is allowed between the lock ring and nut body to the extent that the spring 58 can be compressed and decompressed in the gap or space, yet relative rotational movement of the lock ring and nut body are prevented by the key and key way arrangement.

Figure 6:
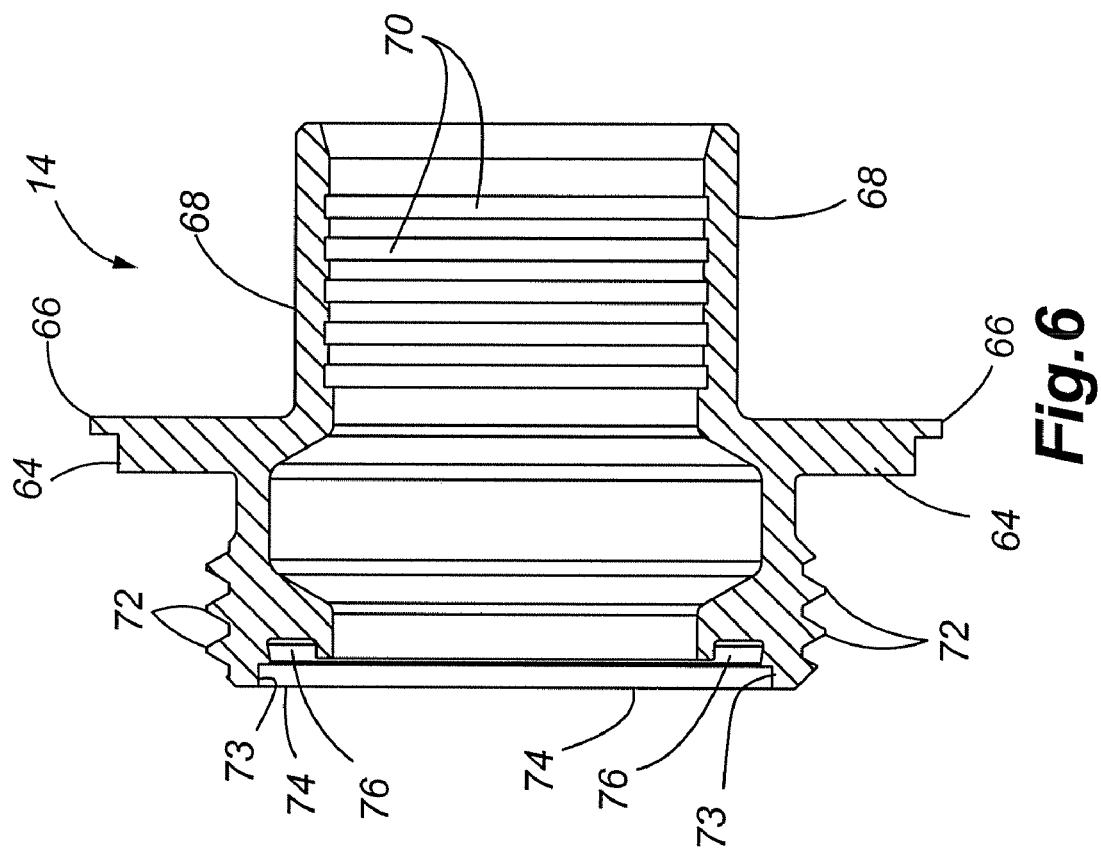
FIG. 6 is a greatly enlarged vertical section of the threaded flange of FIG. 5.
Figure 5:
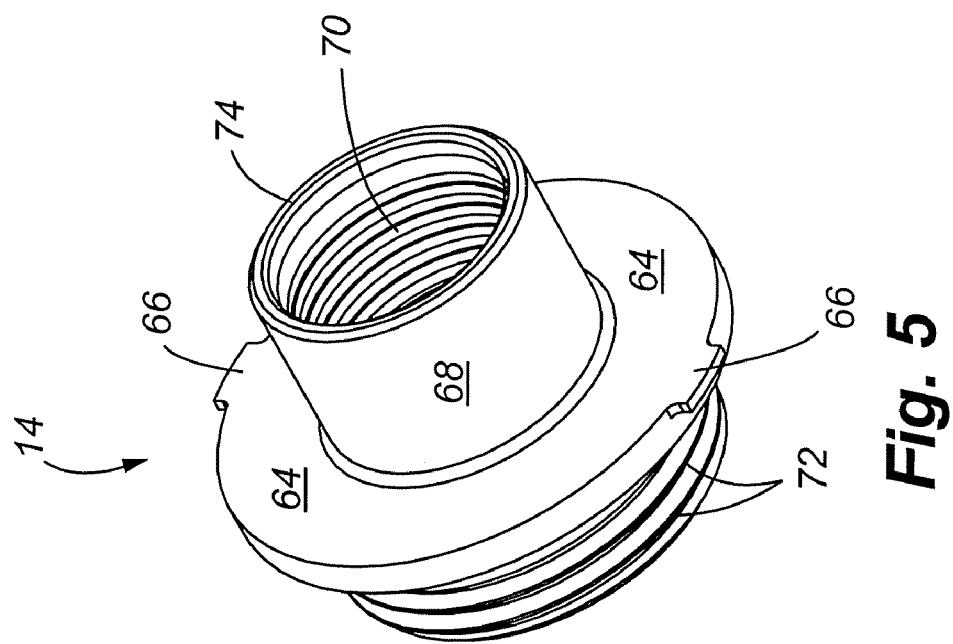
FIG. 5 is an enlarged perspective view of a threaded flange.

Now referring to FIGS. 5 and 6, the particular configuration of the threaded flange is illustrated. The threaded flange 14 is characterized by a protruding rim 64, and one or more projection tabs 66 which are spaced from one another in the same spacing as the notches 40. In the preferred embodiment as shown, a pair of tabs and notches are present. The tabs and notches are spaced from one another approximately 180 degrees. A sleeve 68 extends axially from the rim 64 in one direction, and external threads 72 extend from the rim 64 in the opposite axial direction. The interior surface of the sleeve 68 includes a plurality of swaging grooves 70, and the first conduit 22 preferably attached to the threaded flange as by a swaging operation wherein the free end of the conduit member is swaged with respect to the interior surface of the sleeve 68. The threaded flange 14 further includes a facing surface 74, and an annular groove or slot 76 that is formed on the face 74. The annular groove 76 is sized to receive the o-ring 18.

Figure 8:
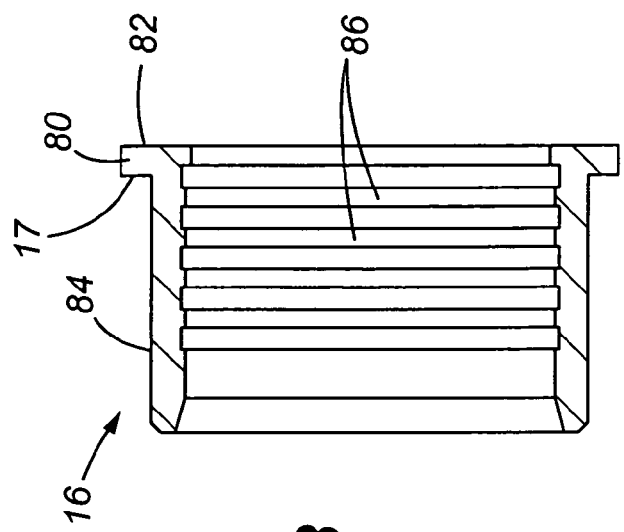
FIG. 8 is a greatly enlarged vertical section of the standard flange of FIG. 7.
Figure 7:
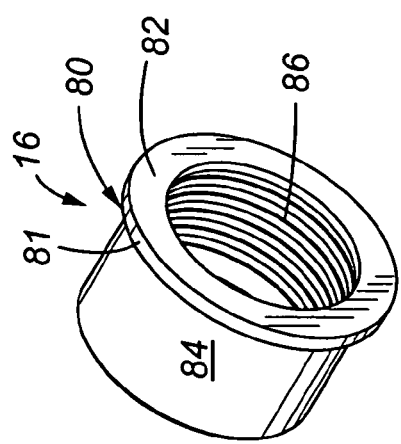
FIG. 7 is an enlarged perspective view of a standard flange.

Now referring to FIGS. 7 and 8, the standard flange 16 is illustrated. The standard flange 16 includes a rib 80, a contact face or surface 82, and a sleeve 84. The interior surface of the standard flange also preferably includes swaging grooves 86 wherein the free end of the second conduit member 24 is preferably swaged with respect to the interior surface of the sleeve 84.

Figure 11:
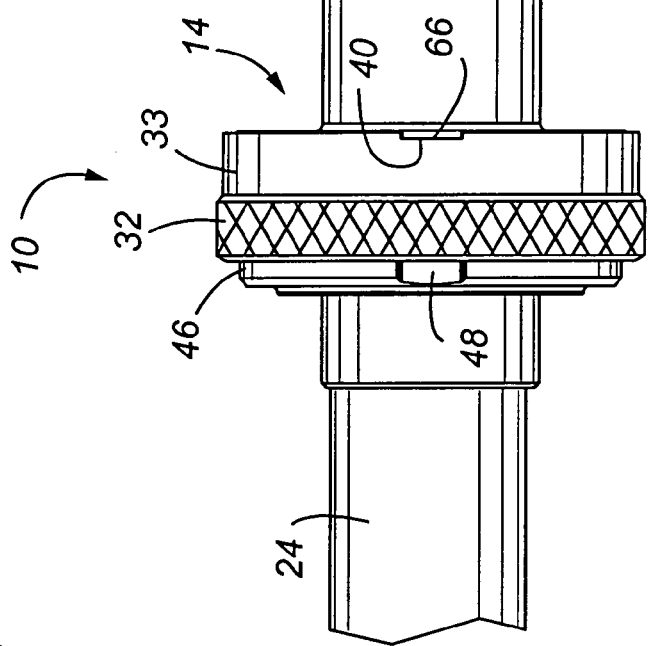
FIG. 11 is an elevation or side view of the coupling assembly showing the coupling assembly in a locked position.
Figure 10:
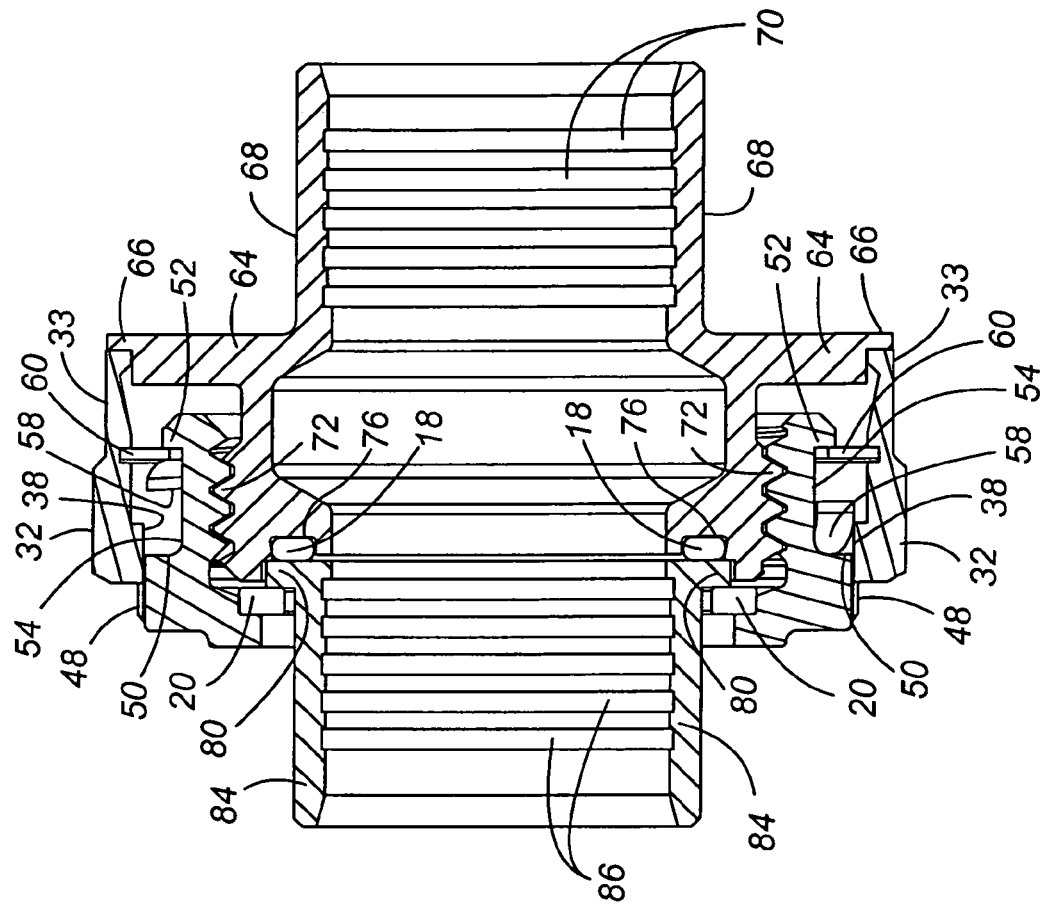
FIG. 10 is a greatly enlarged vertical section of the coupling assembly of the present invention showing the coupling assembly in an unlocked position.
Figure 9:
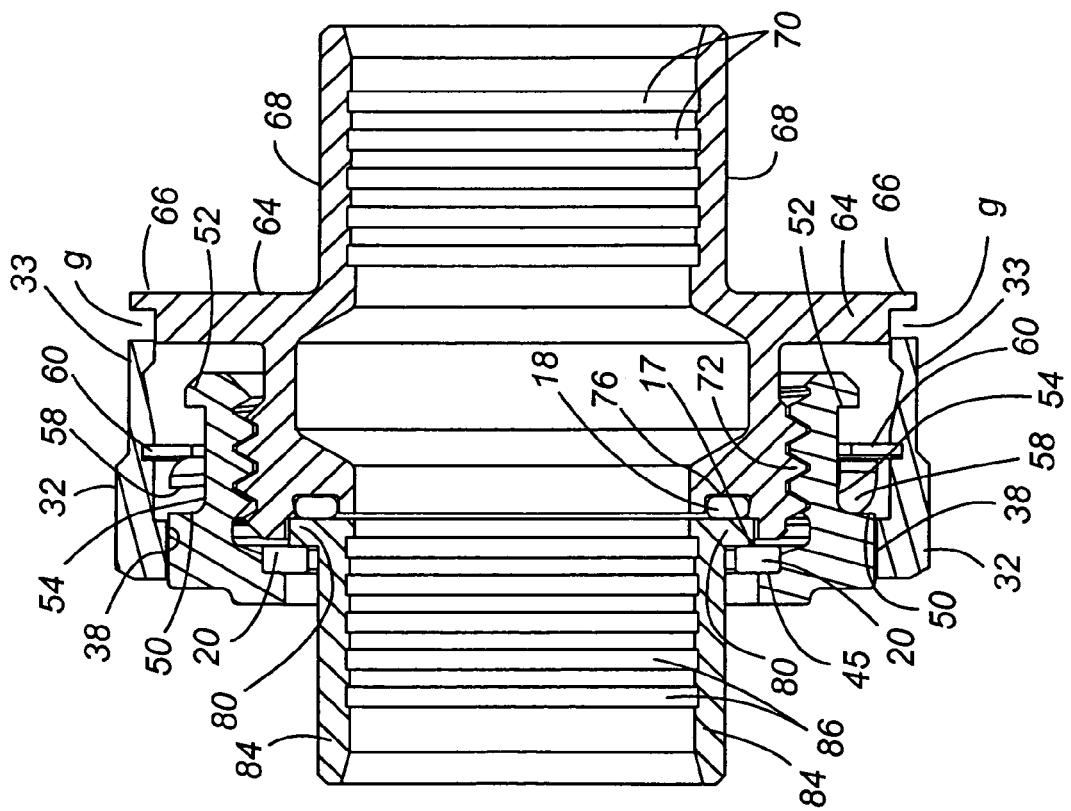
FIG. 9 is a greatly enlarged vertical section of the coupling assembly of the present invention joining confronting ends of first and second conduit members.

Now referring to FIGS. 9 and 10, the coupling assembly is illustrated when assembled. FIG. 9 more specifically illustrates the lock nut group threaded over the threads of the threaded flange, but the lock ring has not yet snap fit into the locked position, thus, some gap g exists between the facing surface of the rim extension 33 and the tabs 66. Accordingly, the spring is still compressed in the gap or space between the nut body and the lock ring. As also shown, the flat washer 20 is trapped between the exterior shoulder 17 of the standard flange and the interior shoulder 45 of the nut body. The o-ring 18 is positioned in the annular groove 76 of the threaded flange, and the facing surface 82 of the standard flange fits in the annular groove and compresses the o-ring thereby creating a leak proof seal. Referring to FIG. 10, the lock ring has been displaced by the force from the spring 58 so that the notches 40 are engaged with the respective tabs 66. FIG. 11 also illustrates the coupling in the locked position. The exterior threads 72 on the threaded flange and the interior threads 56 on the nut body are clocked so that a desired number of rotations of the lock nut group allows the notches 40 to snap fit in engagement with the tabs 66. Because of the biased arrangement between the lock ring and nut body, as the lock nut group is screwed over the threads of the threaded flange, there will be a distinct clicking sound once the notches 40 engage the tabs 66. This audible indication allows the user to know that the lock nut group has now been placed in a locking relationship. In addition to this audible sound, an indicator stripe (not shown) in the form of a florescent colored annular marking may be placed around the portion of the peripheral surface of the rim 64 that becomes covered by the lock ring when the coupling is placed in the locked position. Thus when the indicator stripe or marking disappears, this indicates to a user that the coupling is locked and ready for operation. As can also be seen in FIGS. 9 and 10, the rigid nature of the attachment between the conduit members is further enhanced by the close tolerance fit between the peripheral outer edge or surface 81 of the standard flange with respect to the inner circumferential facing edge 73.

It is also apparent from FIGS. 9 and 10 that there is substantial continuous contact between the components of the coupling assembly which bypass the o-ring thereby providing an electrically conductive path that eliminates electrostatic potential between the conduit members. The path is defined by contact of the standard flange with the flat washer 20, contact of the flat washer with the lock nut group, and contact of the lock nut group with the standard flange by the threaded arrangement. Although the o-ring 18 provides a seal between the standard flange and the threaded flange, metal to metal contact is still achieved across this sealed interface by the electrical conductive path, thereby eliminating the need for an externally mounted bonding strap that is typically used to maintain electrical continuity.

When it is desired to unlock the coupling assembly, the lock ring is pulled axially away from the rim 64 of the threaded flange by grasping the outer rim 32, and then the lock nut group is rotated in an unlocking direction thereby unscrewing the lock nut group from the threaded flange.

The coupling assembly of the present invention provides a reliable and structurally stable connection. The connection is rigid thereby eliminating the need for support hangars at or adjacent the coupling. The coupling is easily installed and requires no bonding strap. The coupling assembly is easily maintained because it can be disassembled down to a component level for inspection and for component replacement as necessary.

The present invention has been described with respect to a preferred embodiment; however, other changes and modifications can be made to the invention within the scope of the claims appended hereto.

What is claimed is:

1. A coupling for interconnecting ends of first and second fluid carrying conduits, said coupling comprising:
   a first coupling member having first and second ends, and a first passageway extending therethrough, said first coupling member further comprising:
      (i) external threads formed adjacent said second end of said first coupling member,
      (ii) a rim spaced from said external threads and having at least one projection formed thereon,
      (iii) an annular groove formed at said second end of said first coupling member, and
      (iv) said first end of said first coupling member attached to said first conduit;
   a second coupling member having first and second ends, and a second passageway extending therethrough, said second coupling member further including:
      (i) a nut member having internal threads formed adjacent said second end of said second coupling member,
      (ii) a lock ring placed over and secured to said nut member,
      (iii) a spring disposed between said nut member and said lock ring enabling biased relative movement of said lock ring with respect to said nut member, and
      (iv) at least one relief formed on a periphery of said lock ring,
   a standard flange secured to said second coupling member, said standard flange including a rib formed on an end thereof, said standard flange having an opposite end attached to said second conduit;
   an o-ring positioned in said annular groove of said first coupling member; and
   wherein said first and second coupling members are connected by engagement of said external threads of said first coupling member with said internal threads of said second coupling member, said rib of said standard flange contacting said o-ring, and said second coupling member is tightened with respect to said first coupling member so that said at least one projection engages said at least one relief thereby maintaining said coupling in a locked position, and said rib of said standard flange having a facing surface contacting said o-ring thereby sealing said first coupling member with respect to said second coupling member and providing a continuous leak proof connection between said first and second passageways.

2. A coupling, as claimed in claim 1, wherein:
   said lock ring further includes an annular slot, a split ring placed in said annular slot, wherein said split ring constrains said spring disposed between said nut member and said lock ring.

3. A coupling, as claimed in claim 1, wherein:
   said nut member further includes an exterior shoulder, an interior shoulder, an annular extension extending between said interior and said exterior shoulders, said spring being mounted over said annular extension and between said interior and said exterior shoulders.

4. A coupling, as claimed in claim 3, wherein:
   said lock ring further includes an annular slot, a split ring placed in said annular slot, and an interior surface circumferentially surrounding said annular extension of said nut member forming a circumferential gap defined by an annular space between said annular extension and said interior surface which receives said spring, said split ring and said exterior shoulder constraining said spring in a longitudinal direction, and said annular extension and said interior surface constraining said spring in a radial direction.

5. A coupling, as claimed in claim 1, wherein:
   said lock ring further includes at least one key formed on an interior surface thereof, and said nut member further includes at least one complementary keyway formed on an exterior surface thereof, wherein said at least one key is placed in said at least one complementary keyway thereby preventing rotation of the nut member with respect to the lock ring.

6. A coupling, as claimed in claim 1, wherein:
   a facing surface of said rim of said first coupling member contacts and compresses said o-ring as said second coupling member is tightened with respect to said first coupling member.

7. A coupling, as claimed in claim 1, wherein:
   when said second coupling member is tightened with respect to said first coupling member, said spring is compressed, and said second coupling member is rotatable so that said spring generates a spring force thereby urging said at least one projection into said at least one relief.

8. A coupling for interconnecting ends of first and second fluid carrying conduits, said coupling comprising:
   a first coupling member having first and second ends, and a first passageway extending therethrough, said first coupling member further comprising:
      (i) external threads formed adjacent said second end of said first coupling member,
      (ii) a rim spaced from said external threads and having at least one first complementary locking means formed an exterior peripheral edge thereof, (iii) art annular groove formed at said second end of said first coupling member, and
(iv) said first end of said coupling member attached to said first conduit;
a second coupling member having first and second ends, and a second passageway extending there through, said second coupling member further including:
(i) a nut member having internal threads formed adjacent said second end of said second coupling member,
(i) a lock ring placed over and secured to said nut member,
(iii) biasing means disposed between said nut member and said lock ring enabling biased relative movement of said lock ring with respect to said nut member, and
(iv) a second complementary locking means formed on a periphery of said lock ring, said second complimentary locking means including at least one relief,
a standard flange secured to said second coupling member, said standard flange having an opposite end attached to said second conduit;
an o-ring positioned in said annular groove of said first coupling member; and
wherein said first and second coupling members are connected by engagement of said external threads of said first coupling member with said internal threads of said second coupling member, and said second coupling member is tightened with respect to said first coupling member so that said first complementary locking means engages said second complementary locking means thereby maintaining said coupling in a locked position, and said standard flange contacting and compressing said o-ring thereby providing a leakproof connection between said first and second coupling members.

9. A coupling for interconnecting ends of first and second fluid carrying conduits, said coupling comprising:
a first coupling member having first and second ends, and a first passageway extending therethrough, said first coupling member further comprising:
(i) external threads formed adjacent said second end of said first coupling member;
(ii) said first end of said coupling member attached to said first conduit; and
(iii) a rim spaced from said external threads and said rim extending radially beyond said external threads;
a second coupling member having first and second ends, and a second passageway extending therethrough, said second coupling member further including:
(i) a nut member having internal threads formed adjacent said second end of said second coupling member,
(ii) a lock ring placed over and secured to said nut member,
(iii) a spring disposed between said nut member and said lock ring enabling biased relative movement of said lock ring with respect to said nut member in a longitudinal direction;
means formed on said nut member and said lock ring constraining rotational movement of said nut member with respect to said lock ring;
means for releasably locking said first coupling member to said second coupling member, said means for releasably locking being disposed on exterior surfaces of said coupling and activated by a predetermined amount of rotation of said second coupling member with respect to said first coupling member;
a standard flange having first and second ends, said first end of said standard flange connected to said second coupling member, and said second end of said standard flange attached to said second conduit;
an o-ring placed between said second end of said first coupling member and said standard flange; and
wherein said first and second coupling members are connected by engagement of said external threads of said first coupling member with said internal threads of said second coupling member, said standard flange contacting said o-ring and compressing said o-ring when said second coupling member is tightened with respect to said first coupling member thereby providing a leakproof connection between said first and second coupling members.

10. A coupling for interconnecting ends of first and second fluid carrying conduits, said coupling comprising:
a first coupling member having external threads formed thereon, a rim spaced from said external threads and said rim having at least one projection formed thereon, a first end of said first coupling member attached to said first conduit;
a second coupling member including:
(i) a nut member having internal threads;
(ii) a lock ring placed over and secured to said nut member;
(iii) at least one relief formed on a periphery of said lock ring;
a standard flange secured to said second coupling member;
an o-ring positioned between said standard flange and said first coupling member; and
wherein said first and second coupling members are connected by engagement of said external threads of said first coupling member of said internal threads of said second coupling member, and said at least one projection engages said at least one relief.

11. A coupling, as claimed in claim 10, further including:
a spring disposed between said nut member and said lock ring enabling biased relative movement of said lock ring with respect to said nut member.

12. A coupling, as claimed in claim 11, wherein:
said lock ring further includes an annular slot, a split ring placed in said annular slot, wherein said split ring constrains said spring disposed between said nut member and said lock ring.

13. A coupling, as claimed in claim 11, wherein:
said nut member further includes an exterior shoulder, an interior shoulder, an annular extension extending between said interior and said exterior shoulders, said spring being mounted over said annular extension and between said interior and said exterior shoulders.

14. A coupling, as claimed in claim 10, wherein:
a facing surface of said rim of said first coupling member contacts and compresses said o-ring as said second coupling member is tightened with respect to said first coupling member.

15. A coupling, as claimed in claim 10, wherein:
said lock ring further includes at least one key formed on an interior surface thereof, and said nut member further includes at least one complementary key way formed on an exterior surface thereof, wherein said at least one key is placed in said at least one complementary key way thereby preventing rotation of the nut member with respect to the lock ring.

* * * * *